Aug. 15, 1967    G. ANDERS    3,335,676
APPARATUS FOR CONTINUOUS TREATMENT OF KNEADABLE MATERIAL
Filed Aug. 12, 1965    2 Sheets-Sheet 1
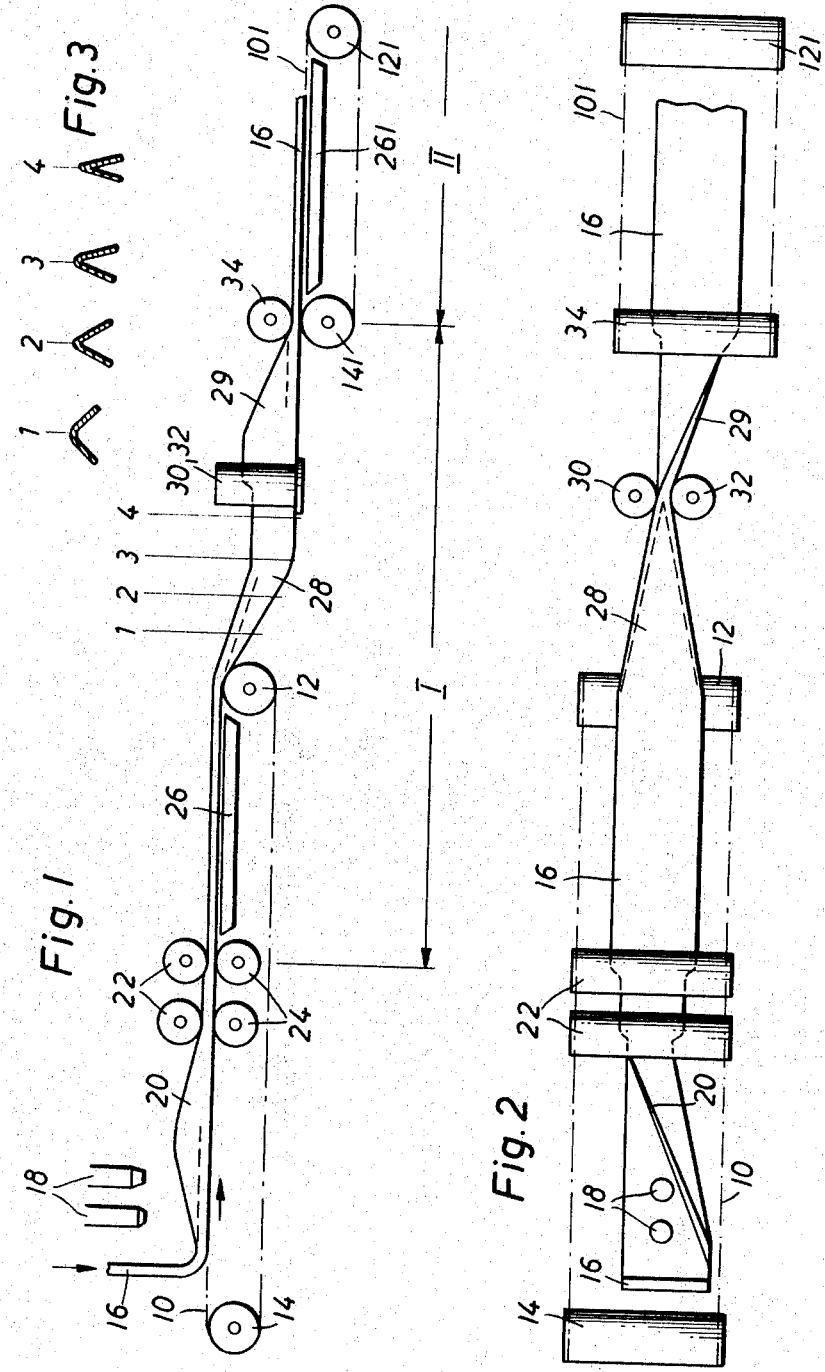
INVENTOR:
GERHARD ANDERS
BY
Breitenfeld & Levine
Attorneys United States Patent Office 3,335,676
Patented Aug. 15, 1967

3,335,676
APPARATUS FOR CONTINUOUS TREATMENT OF KNEADABLE MATERIAL
Gerhard Anders, Viersen, Rhineland, Germany, assignor to Hamac-Hansella Aktiengesellschaft, Viersen, Germany, a corporation of Germany
Filed Aug. 12, 1965, Ser. No. 479,069
Claims priority, application Germany, Aug. 17, 1964, H 53,548
6 Claims. (Cl. 107—4)

This invention relates generally to apparatus for treating kneadable material, and has particular reference to the progressive treatment, in a continuous manner, of a plastic strand or rope emanating from a candy cooking machine or the like.

It is a general object of the invention to provide an apparatus, adapted to operate upon a strand such as that emanating, preferably in a continuous manner, from a vacuum cooker or the like. The improved apparatus includes conveyor belts provided at least in part with cooling means, kneading rollers between which the rope or strand is directed and squeezed into flattened condition, and means for introducing additives to the strand, such as conditioners, flavors coloring, etc.

Heretofore, in the manufacture of candies or similar confections, it has been common practice to cook the materials in batches, and to continue the treatments subsequent to the cooking in similar batch fashion. The custom has been to spread the mass from the cooking machine onto a cooling table, and there to add the required ingredients such as conditioners, flavors, and coloring. After incorporation of these additives, the cooling of the mass was effected by hand, involving a spreading of the mass and successive folding operations to bring the cooled surfaces (i.e., the surfaces in contact with the table) together. By repeated spreading and folding manipulations the mass was cooled to the desired extent, the cooling being thus effected from the inside out, whereby fewer air bubbles were entrapped than would otherwise be the case.

It has been recently proposed to carry on the cooking procedure in such a way that the cooked mass can be continuously withdrawn from the vacuum cooking machine. This affords the desirable opportunity to carry on the further treatment in a similar continuous manner. It is a general object of this invention to provide an apparatus for the progressive treatment of such a continuous strand of kneadable material. A more particular object of the invention is to provide an apparatus in which the kneading and cooling of the strand is carried out in such a way that the cooled surfaces of a flattened strand are continually brought together, whereby cooling of the mass from the inside out is assured. In this way, a faster and more uniform cooling is achieved.

Another object of the invention is to provide an apparatus of outstanding simplicity from a structural standpoint, and thoroughly practical and fully automatic in its performance characteristics.

According to the invention, the objectives are achieved by a cooperative assortment of elements including a first conveyor belt adapted to receive the strand thereon and advance it lengthwise, a means effective upon the advancing strand to double it upon itself by upward deflection of one longitudinal half onto the other, kneading rollers adapted to receive the doubled strand and to restore its original thickness, a cooling means beneath the conveyor belt adjacent to its discharge end, a saddle-shaped deflector adapted to receive the strand and cause it to be doubled upon itself by gravitational deflection of its longitudinal halves downwardly into vertical contact, a set of vertical kneading rollers adapted to received the doubled strand and to reduce its thickness, and a guide for restoring the strand to a horizontal disposition and causing it to be deposited upon a second conveyor belt by means of which its advancement can be continued.

Situated above the first conveyor belt are arrangements for applying additives to the strand. The additives are applied to the upper surface of the strand in advance of the means which doubles the strand upwardly upon itself, as a result of which the additives become enfolded by the strand. After the subsequent kneading, the strand is cooled on its underside, and then it is doubled upon itself in a downward direction so that the cooled surfaces come into contact on the interior. The strand is then again subjected to kneading.

Depending upon the degree of cooling that is required or thought to be desirable, the invention affords the possibility, in a modified embodiment, of utilizing the second conveyor belt as the first of an additional group of elements which include a cooling means, another saddle-shaped deflector, vertical kneading rollers positioned to receive the double strand and reduce its thickness, and a guide for restoring the strand again to a horizontal disposition. The cooled conveyor belt, the saddle deflector, and the kneading rollers constitute what may be considered to be a cooling and kneading unit. To achieve extensive cooling and kneading of the plastic strand, a number of such units can be arranged in succession.

In the eventuality that the additives have been thoroughly distributed and the strand has been thoroughly kneaded, but is still insufficiently cooled, a further modification of the invention includes the provision of a plurality of terminal conveyor belts arranged in superposed relation and traveling successively in opposite directions, each of these belts being provided with cooling means. The first of these final belts is positioned to receive the strand as it leaves the final guide that restores it to a horizontal disposition, and by traveling successively from each conveyor belt to the one beneath it, the opposite surfaces of the strand are progressively cooled in alternate sequence. In this way, without any further kneading operations, a relatively quick additional cooling of the strand can be effected.

When the strand leaves the apparatus provided by the present invention, it is ready to be fed directly into known forming apparatus.

Several embodiments of the invention are diagrammetically depicted in the accompanying drawings in which:

FIG. 1 is a schematic side view of an apparatus embodying the features of this invention, the first kneading-cooling unit being shown in full, and an optional second unit being depicted only in part;

FIG. 2 is a plan view of the apparatus shown in FIG. 1;

FIG. 3 is a series of cross-sectional views through the saddle-shaped deflector, these views being taken substantially along the lines designated 1, 2, 3 and 4 in FIG. 1.

Figure 4:
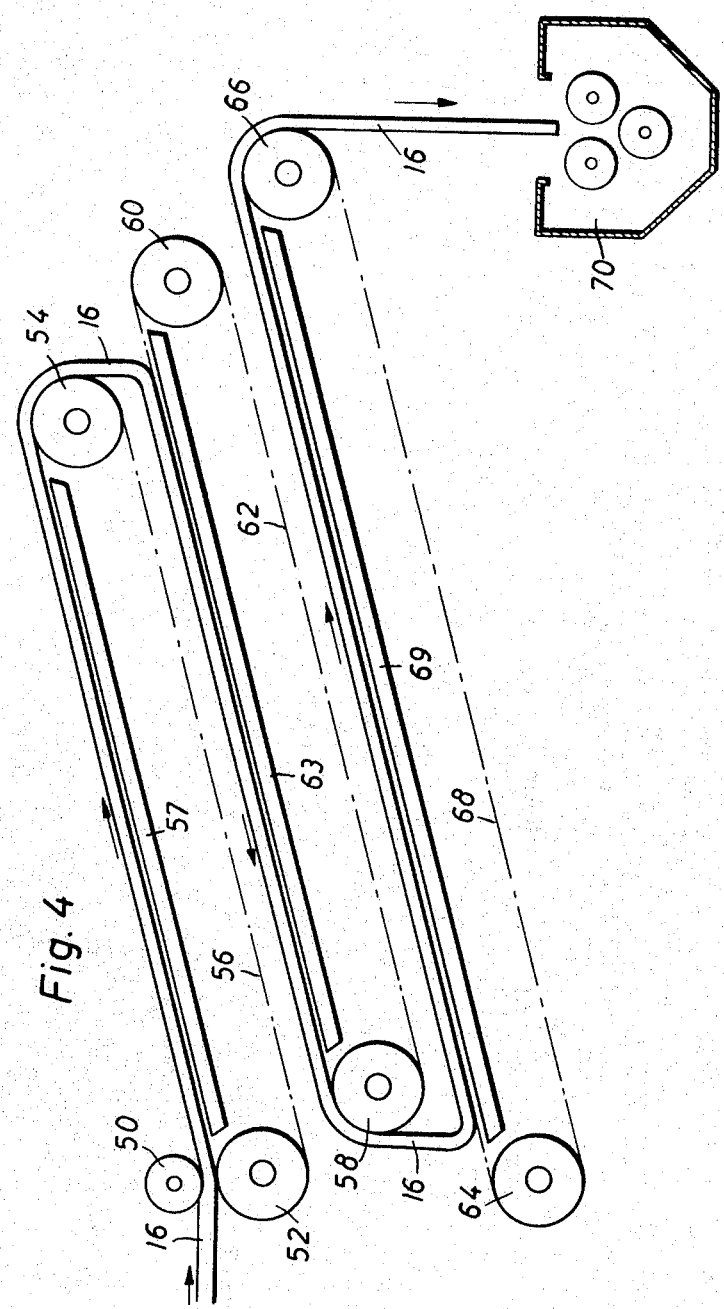
FIG. 4 is a schematic side view of an optional series of additional conveyor belts adapted to effect further cooling without additional kneading.

The first conveyor belt is shown at 10 in FIGS. 1 and 2. It travels around the illustrative guide rollers 12 and 14, of which at least the roller 12 is driven so as to move the upper lap of the conveyor belt in the right-hand direction as viewed in FIGS. 1 and 2. The strand of plastic material 16 (which may be for example a strand emanating in continuous fashion from a vacuum cooking machine) is deposited from above, in the direction of the vertical arrow, onto the upper lap of the belt 10.

By means of hoppers or other arrangements 18 the required or desired additives are laid upon the upper surface of the strand 16. These may be, for example, conditioners, flavorings, or coloring matter, and they are strewed or sprayed on to the band-like strand 16. Immediately thereafter, the strand encounters a plow-shaped deflector 20, or equivalent means, which doubles the strand upon itself by upward deflection of one longitudinal half onto the other, as best indicated in FIG. 2. In this way the additives become enfolded within the strand.

The strand is now of double thickness. In order that the thickness may again be reduced, kneading rollers 22, 24 are arranged to receive the double strand and squeeze it stepwise toward a restoration of its original thickness.

The apparatus thus far described assures the enfolding of the additives, causing them to lie, for the most part, on the interior of the doubled-over strand. This not only prevents loss of these additives but also prevents the possibility of having them adhere to the conveyor belt 10, the deflecting means 20, or the kneading rollers 22, 24.

The part of apparatus presently to be described serve to complete the thorough kneading of the mass, and at the same time to cool it. Also, the additives are uniformly distributed throughout the mass, and the temperature is reduced to the degree which is suitable or desirable for the further treatment of the material.

With these objectives in view, the upper lap of the conveyor belt 10 is provided on its underside, in the region adjacent to its discharge end, with a cooling device 26. Advantageously this device may employ a circulating cooling medium which functions through the conveyor belt 10 to cool the underside of the strand 16.

As it leaves the discharge end of the conveyor 10, the strand 16 moves onto a fixed saddle-shaped deflector 28, operative to double the strand upon itself in a downward direction by gravitational deflection of its longitudinal halves downwardly into vertical contact. In this way the cooled undersurface of the strand is brought to the interior of the doubled-over mass. The top surface of the deflector 28 is of gradually diminishing width, in the direction of advancement of the strand, as indicated in FIG. 3. This serves to bring the plastic strand gradually into the doubled-over position desired.

As it emanates from the saddle deflector 28, the strand is again of double thickness. Positioned at this part of its travel are vertical kneading rollers 30, 32 adapted to receive the doubled strand and to reduce its thickness. The rollers 30, 32 may be spaced apart for example, a distance less than the thickness of the doubled strand that enters between them, yet slightly greater than the original thickness of the strand.

The rollers 30, 32 serve as a first set of rollers for restoring the strand to its original thickness. As it leaves these rollers the strand encounters a guide or deflector 29 which returns the strand to a horizontal disposition and directs it onto a second conveyor belt 101. This conveyor belt travels over guide rollers 121 and 141 of which at least the roller 121 is driven to continue the advancement of the strand. On the underside of its upper lap, the conveyor belt 101 is provided with a cooling apparatus 261.

Cooperating with the guide roller 141, and lying above the conveyor belt 101 is a roller 34 adapted to squeeze the strand that passes beneath it so as to restore the original thickness to it.

The first unit or group of kneading and cooling elements is designated "I" and is completely depicted. The belt 101 depicts the possible beginning of a second group "II" which would include a second saddle-shaped deflector corresponding to that shown at 28, vertical kneading rollers corresponding to those shown at 30, 32, and another guide corresponding to that shown at 29. These additional elements have not been shown. It will be understood, however, that for the further kneading and simultaneous cooling of the strand 16, numerous groups "I," "II," etc., can be arranged in succession, as may be desired, to bring about the desired degree of thorough kneading and cooling.

In the event that the material has been kneaded to the full desired extent, when it reaches the end of the apparatus embodying one or more groups "I," "II," etc., but has not yet been cooled to the desired degree, additional apparatus of the character shown in FIG. 4 can be provided to accomplish the further cooling of the strand 16 without subjecting it to further kneading.

This apparatus (FIG. 4) consists of a plurality of conveyor belts (in the illustrated embodiment, three such belts) arranged in superposed relation. They are driven in the directions indicated by arrows in FIG. 4, i.e., the upper laps travel successively in opposite directions. Also, the ends of the conveyor belts are in staggered relation to each other, so that the strand 16 automatically travels from the end of one conveyor belt onto the upper lap of the belt lying directly beneath. Each of these conveyor belts is cooled, and in this way the opposite surfaces of the strand are progressively cooled in alternate sequence.

More particularly, it will be noticed that three conveyor belts 56, 62 and 68 have been shown in FIG. 4 in a relationship of the character described. The belt 56 extends around guide rollers 52 and 54; the belt 62 extends around rollers 58 and 60; and the belt 68 extends around rollers 64 and 66. Advantageously a driving means is associated with at least the rollers 54, 58 and 66. Beneath the upper laps of the conveyor belts are cooling devices 57, 63, and 69, respectively, adapted to cool the lower surface of the strand resting directly upon them.

The strand 16 at the upper left of FIG. 4 may be assumed to have been subjected to a final kneading between a pair of rollers such as those shown at 30 and 32, and then turned to a horizontal disposition by a deflector of the character shown at 29. This preliminary kneaded strand is then subjected to a further kneading between the rollers 50 and 52 at the input end of the conveyor 56. The function of this roller pair is the same as that hereinbefore described in connection with the rollers 34 and 141 in FIGS. 1 and 2. Then the strand 16 is subjected to the cooling action of the upper lap of the conveyor 56. At the discharge end the strand is directed to the upper lap of the next lower belt 62, thus subjecting the opposite surface of the strand to the cooling action of the device 63. Along the upper lap of the lower belt 68 the first surface of the strand is again subjected to cooling. As many belts of this character can be arranged in sequence, as may be necessary to achieve the desired cooling. At the discharge end of the final conveyor belt, the strand 16 can be fed directly into the known forming device 70, as shown.

The surfaces of the several conveyor belts are advantageously composed of a material adapted to withstand both the heat of the strand thereon and the cold of the cooling means. Steel is a desirable material.

It will be understood that changes in many of the details herein described and illustrated may obviously be made by those skilled in the art without necessarily departing from the spirit and scope of the invention as expressed in the appended claims.

What is claimed is:

1. An apparatus for the progressive treatment of a continuous flattened strand of kneadable material, comprising:

(a) a first conveyor belt arranged to receive the strand thereon and advance it lengthwise, (b) means effective upon the advancing strand to double it upon itself by upward deflection of one longitudinal half onto the other, (c) kneading rollers positioned to receive the doubled strand and reduce its thickness, (d) cooling means beneath the conveyor belt adjacent to its discharge end, (e) a saddle-shaped deflector at said discharge end adapted to receive said strand thereon, said deflector being of gradually diminishing width so that the advancing strand is doubled upon itself by gravitational deflection of its longitudinal halves downwardly into vertical contact, (f) vertical kneading rollers positioned to receive the doubled strand and reduce its thickness, (g) a guide for restoring the strand to a horizontal disposition, and (h) kneading rollers positioned to receive the strand and feed it onto (i) a second conveyor belt arranged to continue its advancement.

2. An apparatus as defined in claim 1, in which said kneading rollers (h) and second conveyor belt (i) are the first elements of at least one additional group of elements corresponding to those set forth in (c)–(g).

3. An apparatus as defined in claim 1, including also a plurality of final conveyor belts arranged in superposed relation and traveling successively in opposite directions, each of said conveyor belts being provided with cooling means and the first of them being positioned to receive the strand as it leaves the guide (g), whereby the opposite surfaces of the strand are progressively cooled in alternate sequence.

4. An apparatus as defined in claim 3, in which the conveyor belts are formed of a material adapted to withstand both the heat of the strand thereon and the cold of said cooling means.

5. An apparatus as defined in claim 4, in which said conveyor belt material is steel.

6. An apparatus as defined in claim 1, including also a means for applying additives to said strand, said means being positioned in advance of said doubling means (b), whereby the additives become enfolded by the strand.

References Cited

UNITED STATES PATENTS

| | | | |
|---|---|---|---|
| 2,648,297 | 8/1953 | Cloud | 107—1 |
| 3,063,391 | 11/1962 | Johnston et al. | 107—4 |
| 3,125,037 | 3/1964 | Johnston | 107—54 |

WALTER A. SCHEEL, *Primary Examiner.*

J. SHEA, *Assistant Examiner.*